(12) United States Patent
Jyono et al.

(10) Patent No.: US 7,294,946 B2
(45) Date of Patent: Nov. 13, 2007

(54) MOTOR USING DYNAMIC GAS BEARINGS

(75) Inventors: Masahiro Jyono, Ozu (JP); Yasunori Tokuno, Ozu (JP); Takeyoshi Yamamoto, Ozu (JP); Taizo Ikegawa, Ozu (JP); Satoko Miki, Niihama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 109 days.

(21) Appl. No.: 10/543,907

(22) PCT Filed: Feb. 24, 2004

(86) PCT No.: PCT/JP2004/002149

§ 371 (c)(1),
(2), (4) Date: Jul. 29, 2005

(87) PCT Pub. No.: WO2004/077643

PCT Pub. Date: Sep. 10, 2004

(65) Prior Publication Data

US 2006/0170297 A1    Aug. 3, 2006

(30) Foreign Application Priority Data

Feb. 25, 2003    (JP) .............................. 2003-046642

(51) Int. Cl.
- H02K 5/16 (2006.01)
- H02K 7/08 (2006.01)
- F16C 33/04 (2006.01)
- F16C 33/10 (2006.01)

(52) U.S. Cl. ...................... 310/90; 384/107; 384/112; 384/132; 360/99.08

(58) Field of Classification Search .............. 310/67 R, 310/90; 360/98.07, 99.04, 99.08; 384/100, 384/107, 112–113, 121–124, 132
See application file for complete search history.

(56) References Cited

U.S. PATENT DOCUMENTS 3,994,017 A * 11/1976 Barkhuff et al. ......... 360/98.03

(Continued)

FOREIGN PATENT DOCUMENTS

JP        11-69725        3/1999

(Continued)

*Primary Examiner*—Nguyen Tran
(74) *Attorney, Agent, or Firm*—Steptoe & Johnson LLP

(57) ABSTRACT

A dynamic pressure gas bearing motor in which a radial dynamic pressure gas bearing and a thrust dynamic pressure gas bearing are ensured to have sufficient length and diameter even though the clamping screw holes for introducing screws to reliably hold a disk are formed in the top wall of the motor rotation body. The top surface of the support shaft (2) has a downward recession, the motor rotation body (3) has a protruded part (3) facing the recession (2a) of the support shaft and fitted therein with clearance, a radial dynamic pressure gas bearing (6) is formed by the inner periphery of the motor rotation body and the outer periphery of the support shaft, a thrust dynamic pressure gas bearing (7) is formed by the protruded part of the motor rotation body and the recession of the support shaft, the thrust dynamic pressure gas bearing is provided below the top end of the radial dynamic pressure gas bearing, and clam screw holes (3c) for holding a disk are formed in the top wall of the motor rotation body above the recession of the support shaft.

6 Claims, 7 Drawing Sheets

U.S. PATENT DOCUMENTS

| | | | | |
|---|---|---|---|---|
| 4,715,731 A | * | 12/1987 | Tittizer | 384/100 |
| 4,796,141 A | * | 1/1989 | Tsumura | 360/135 |
| 5,352,947 A | * | 10/1994 | MacLeod | 310/67 R |
| 5,427,456 A | * | 6/1995 | Hensel | 384/112 |
| 5,471,104 A | * | 11/1995 | Toshimitsu et al. | 310/90 |
| 5,559,382 A | * | 9/1996 | Oku et al. | 310/90 |
| 5,658,080 A | * | 8/1997 | Ichiyama | 384/112 |
| 5,847,479 A | * | 12/1998 | Wang et al. | 310/90 |
| 6,040,648 A | * | 3/2000 | Kawawada et al. | 310/90 |
| 6,219,199 B1 | * | 4/2001 | Sakuragi et al. | 360/99.08 |

FOREIGN PATENT DOCUMENTS

| | | |
|---|---|---|
| JP | 2000-50568 | 2/2000 |
| JP | 2001-352726 | 12/2001 |

* cited by examiner

MOTOR USING DYNAMIC GAS BEARINGS

The present application is based on International Application PCT/JP2004/002149, filed Feb. 24, 2004, which application is incorporated herein by reference in its entirety.

TECHNICAL FIELD

The present invention relates to a small motor bearing, and in particular to a motor bearing suitable for motors that require accurate positioning in both the radial and thrust directions, such as those in hard disk drives (hereafter termed HDD).

BACKGROUND ART

A small motor, which is a so called spindle motor in HDDs must rotate with high precision in order to read, write, and fetch information. Recently, high accuracy is required particularly in positioning in both the radial and thrust directions because of high record densities. Furthermore, for the requirement of energy saving along with down-sizing the HDD, it is also important to reduce the power consumption of the motor.

Conventionally, ball bearings have been extensively used as the motor bearing described above. However, because of the requirement of highly accurate rotation, ball bearings have been gradually replaced with lubricated dynamic pressure oil type bearings. Dynamic pressure oil bearing motors, which utilize oil, are often influenced by the oil properties. This is particularly concerned with increased power consumption at low temperatures and oil leakage and deterioration at high rotation rates. To resolve these problems, it is suggested to use gas in place of lubricating oil in dynamic pressure bearings. For example, when air is used, no problems occur in relation to increased power consumption and lubricant leakage and deterioration. However, because the viscosity of the air is in the order of thousandth of that of the oil, dynamic pressure has to be generated with a larger diameter in order to obtain a rigid bearing that bears an equivalent load to its oil counterpart.

In order to make a dynamic pressure gas bearing as large as possible in the limited space of the motor rotation body, a construction is proposed in which a motor rotation body is supported by a radial dynamic pressure gas bearing formed by the inner surface of the motor rotation body and the outer surface of a stepped cylindrical support shaft and also supported by a thrust dynamic pressure gas bearing formed by the top surface of the support shaft and the bottom surface of the insert of the motor rotation body (reference Japanese Laid Open Patent Publication 2000-50568).

On the other hand, in order to give the radial dynamic pressure gas bearing an extended length, an inner rotor construction is proposed in which a rotor magnet is provided on the outer periphery of a disk receiving part of the motor rotation body with a specified clearance from a set of radial stator coils concentric with the support shaft (reference Japanese Laid Open Patent Publication 2001-352726).

DISCLOSURE OF INVENTION

Problems to be Solved by the Invention

When prior art dynamic pressure gas bearing motors are used in the HDD, the prior art dynamic pressure gas bearing motor described in the Japanese Laid Open Patent Publication 2000-50568 above fails to take into account clamping screw holes, essential to holding a disk or a magnetic recording medium. For example, as shown in FIG. 13, in order to form clamping screw holes 53 in the top wall 51a of a motor rotation body 51 above the thrust dynamic pressure gas bearing 52, the top wall of the motor rotation body 51 is increased in thickness for smooth boring of the clamping screw holes 53 and a radial dynamic pressure gas bearing 54 has to be reduced in length for the increased thickness of the top wall 51a of the motor rotation body 51. This may deteriorate the bearing's rigidity. In FIG. 13, a support shaft 55 is mounted upright on a mounting base 56. A thrust dynamic pressure gas bearing 52 is formed by the top wall of a larger diameter part 55a of the support shaft 55 at the top and the bottom surface of the top wall 51a of the motor rotation body 51. FIG. 13 also shows a set of stator coils 57 concentric with the support shaft 55 and a rotor magnet 58 provided on the outer periphery of the lower part of the motor rotation body 51.

As shown in FIG. 13, when the clamping screw holes 53 are formed in the top wall 51a of the motor rotation body 51 in a manner in which the clamping screw holes 53 are blind holes, not through-holes, formed in the top wall 51a of the motor rotation body 51, round holes 53b should be previously drilled before the formation of thread faces 53a. Therefore, in order to drill round holes 53b, the top wall 51a of the motor rotation body 51 has to be made larger in thickness enough to give the thread face 53a an effective screw length. As a result, the radial dynamic pressure gas bearing 54 has a reduced length.

On the other hand, when the clamping screw holes 53 are through-holes formed in the top wall 51a of the motor rotation body 51, the thread faces 53a can be made over the entire length of the clamping screw hole 53. However, a drilling force may be applied to the bottom surface of the top wall 51a of the motor rotation body 51 causing protrusions during the formation of the clamping screw holes 53. Sealing (not shown) may be required to close the clamping screw holes 53. Therefore, as shown in FIG. 14, a thrust dynamic pressure gas bearing cannot be formed between the bottom surface of the top wall 51a of the motor rotation body 51 and the top surface of the larger diameter part 56 of the support shaft 55.

As disclosed in the Japanese Laid Open Patent Publication 2001-352726, when clamping screw holes are formed in the side wall of the motor rotation part at the upper part, a screw diameter for obtaining a high clamping force is required to prevent the disk from shifting because of vibration and shock. The side wall of the motor rotation body has to be increased in thickness in order to form the screw holes. As a result, the radial dynamic pressure gas bearing has a reduced diameter, leading to the deteriorated rigidity of the bearing.

The present invention is proposed to resolve the problems described above and the purpose of the present invention is to provide a dynamic pressure gas bearing motor that ensures a radial dynamic pressure gas bearing and a thrust dynamic pressure gas bearing having sufficient length and diameter, thereby providing sufficient bearing rigidity even though the clamping screw holes for introducing screws to reliably hold a disk are formed in the top wall of the motor rotation body.

Means to Solve the Problems

The invention according to the first aspect of the invention is a dynamic pressure gas bearing motor in which a cylindrical support shaft is mounted upright on a mounting base, a closed-end cylindrical motor rotation body is fitted onto the support shaft to enclose its outer periphery at the top and on the side with clearance, a rotor magnet is attached to the motor rotation body or member fixed to the motor rotation body, a set of stator coils is concentrically provided with the support shaft and facing the rotor magnet, the motor rotation body is supported by a radial dynamic pressure gas bearing and a thrust dynamic pressure gas bearing formed by the clearance, characterized by the fact that the top surface of the support shaft has a downward recessed component, and the motor rotation body has a protruded part facing the recession of the support shaft and fitted therein with clearance, the radial dynamic pressure gas bearing is formed by the inner periphery of the motor rotation body and the outer periphery of the support shaft, the thrust dynamic pressure gas bearing is formed by the protruded part of the motor rotation body and the recession of the support shaft, a thrust dynamic pressure gas bearing being provided below the top end of the radial dynamic pressure gas bearing, and clamping screw holes for holding a disk or a magnetic record medium being formed in the top wall of the motor rotation body above the recession of the support shaft.

With the above construction, clamping screw holes for inserting screws to reliably hold a disk can be formed in the top wall of the motor rotation body while a thrust dynamic pressure gas bearing is formed by the protruded part of the motor rotation body and the recession of the support shaft. Furthermore, the radial dynamic pressure gas bearing can have a larger length.

The invention according to the second aspect of the invention is the dynamic pressure gas bearing motor characterized by the fact that the clamping screw holes are through-holes formed in the top wall of the motor rotation body outside the protruded part and facing the recession of the support shaft from above.

With this construction, the clamping screw holes are through-holes in the top wall of the motor rotation body so that the thickness of the top wall of the motor rotation body is equal to the effective screw length and the top wall of the motor rotation body can have a reduced thickness. In addition, the clamping screw holes are formed in the top wall of the motor rotation part outside the protruded part. Therefore, a thrust dynamic pressure gas bearing can formed by the protruded part of the motor rotation body and the recession of the support shaft without inconvenience regardless of possible protrusions as a result of the downward drilling or sealing of the clamping screw holes.

The invention according to the third aspect of the invention is the dynamic pressure gas bearing motor according to the first aspect of the invention characterized by the fact that the clamping screw holes are blind holes formed in the top wall of the motor rotation body at the protruded part, which do not reach the bottom surface of the protruded part.

With this construction, a thrust dynamic pressure gas bearing formed by the protruded part of the motor rotation body and the recession of the support shaft can have a larger area.

The invention according to the fourth aspect of the invention is the dynamic pressure gas bearing motor according to any of the first to third aspects of the invention characterized by the fact that the support shaft has a stepped cylinder formation with a larger diameter part having a diameter which is larger than the joint to the mounting base and the motor rotation body is provided with a thrust collar that flanks the larger diameter part of the support shaft from below with clearance so that a thrust dynamic pressure gas bearing is also formed by the lower surface of the larger diameter part of the support shaft and the top surface of the thrust collar.

With this construction, a thrust dynamic pressure gas bearing is also formed by the bottom surface of the larger diameter part of the support shaft and the top surface of the thrust collar.

The invention according to the fifth aspect of the invention is the dynamic pressure gas bearing motor characterized by the fact that the support shaft consists of: a cylinder mounted upright on the mounting base and a thrust disk plate having a center hole and fixed to the inner periphery of the cylinder at the top end to serve as the recession, a column member is provided coincidently with the rotation axis of the motor rotation body, which passes through the center hole of the thrust plate of the support shaft and has a rotor magnet on the outer periphery, a set of stator coils is provided inside the cylinder of the support shaft to face the rotor magnet, a radial dynamic pressure gas bearing is formed by the inner periphery of the motor rotation body and the outer periphery of the cylinder of the support shaft, and a thrust dynamic pressure gas bearing is formed by the protruded part of the motor rotation body and the top surface of the thrust plate of the support shaft serving as the recession.

With this construction, the motor drive consisting of the rotor magnet and stator coils is provided inside the support shaft so that the radial dynamic pressure gas bearing can have increased length, which yields sufficient bearing rigidity.

The invention according to the sixth aspect of the invention is the dynamic pressure gas bearing motor according to the fifth aspect of the invention characterized by the fact that a thrust collar or flange (9a) is provided to the column member above the rotor magnet, which faces the bottom surface of the thrust plate and a thrust dynamic pressure gas bearing is formed by the bottom surface of the thrust plate and the top surface of the thrust collar.

With this construction, a thrust dynamic pressure gas bearing can be also formed by the bottom surface of the thrust plate and the top surface of the thrust collar.

The invention according to the seventh aspect of the invention is a dynamic pressure gas bearing motor wherein a cylindrical support shaft is mounted upright on a mounting base, a closed-end cylindrical motor rotation body is fitted on the support shaft to enclose the outer periphery thereof at the top and on the side with clearance, a rotor magnet is provided to the motor rotation body or a member attached to the motor rotation body, a set of stator coils is provided concentrically with the support shaft and facing the rotor magnet, the motor rotation body is supported by a radial dynamic pressure gas bearing and a thrust dynamic pressure gas bearing formed by the clearance, characterized by the fact that the radial dynamic pressure gas bearing is formed by the inner periphery of the motor rotation body and the outer periphery of the support shaft, the thrust dynamic pressure gas bearing is formed by the top surface of the support shaft and the bottom surface of the motor rotation body that faces the top surface of the support shaft, and a screw hole plate having clamping screw holes for holding a disk or a magnetic recording medium is attached to the top wall of the motor rotation body.

With this construction, the clamping screw holes $3c$ are through-holes formed in the screw hole plate 11, not directly in the top wall $3b$ of the motor rotation body 3. This can eliminate potential incomplete prepared screw holes, namely, round holes with no threads, in the screw processing and allows the motor rotation body 3 to have a thinner top wall 3b even for a standard length screw. As a result, the diameter and length of the radial dynamic pressure gas bearing 6 can be maximized in the motor rotation body and a sufficient bearing rigidity can be obtained. Because the motor rotation body 3 constituting a dynamic pressure gas bearing has no holes formed, the motor rotation body 3 and screw hole plate 11 can be cleaned separately in the cleaning step. This can prevent possible contamination of the bearing and surface of the motor rotation body 3 with cutting oil and processing residue remaining in the clamping screw holes 3c, improving the reliability and reducing the substances that likely causes malfunctions in the HDD device.

The invention according to the eighth aspect of the invention is the dynamic pressure gas bearing motor according to the seventh aspect of the invention characterized by the fact that the support shaft has a stepped cylindrical form provided with a larger diameter part having a larger diameter than the joint to the mounting base, the thrust dynamic pressure gas bearing is formed by the top surface of the larger diameter part and the bottom surface of the motor rotation body that faces the top surface of the support shaft, a thrust collar is provided to the motor rotation body, which flanks the larger diameter part of the support shaft from below with clearance, and a thrust dynamic pressure gas bearing is also formed by the bottom surface of the larger diameter part of the support shaft and the top surface of the thrust collar.

With this construction, a thrust dynamic pressure gas bearing can be also formed by the bottom surface of the larger diameter part of the support shaft and the top surface of the thrust collar.

The invention according to the ninth aspect of the invention is the dynamic pressure gas bearing motor according to the seventh aspect of the invention characterized by the fact that the support shaft consists of a cylinder mounted upright on the mounting base and a thrust disk plate having a center hole and fixed to the inner periphery of the cylinder at the top end, a column member being provided coincidently with the rotation axis of the motor rotation body, which passes through the center hole of the thrust plate of the support shaft and has a rotor magnet at the outer periphery, a set of stator coils is provided inside the cylinder of the support shaft to face the rotor magnet, a thrust collar or flange is provided to the column member above the rotor magnet, which flanks the bottom surface of the thrust plate, the radial dynamic pressure gas bearing is formed by the inner periphery of the motor rotation body and the outer periphery of the cylinder of the support shaft, the thrust dynamic pressure gas bearing is formed by the protruded part of the motor rotation body and the top surface of the thrust plate of the support shaft serving as the recession, and a thrust dynamic pressure gas bearing is also formed by the bottom surface of the thrust plate and the top surface of the thrust collar.

With this construction, a thrust dynamic pressure gas bearing can be also formed by the bottom surface of the thrust plate and the top surface of the thrust collar.

The invention according to the tenth aspect of the invention is the dynamic pressure gas bearing motor according to any of the seventh to ninth aspects of the invention characterized by the fact that the screw hole plate has a ring shape with multiple clamping screw through-holes formed at specified intervals.

With this construction, the screw hole plate can be precisely positioned to attach it to the motor rotation body.

The invention is the dynamic pressure gas bearing motor according to any of the seventh to ninth aspects of the invention characterized by the fact that the screw hole plate has a single clamping screw through-hole and multiple screw hole plates are attached to the top wall of the motor rotation body at specified intervals.

With this construction, the screw hole plate can be precisely positioned to attach it to the motor rotation body. Furthermore, the screw hole plate can be standardized and applied to clamps with different pitch diameters, which will reduce cost.

EFFECT OF THE INVENTION

As described above, the dynamic pressure gas bearing motor of the present invention uses a support shaft the top surface of which has a downward recession and a motor rotation body having a recession facing the recession of the support shaft into which it is fitted with clearance. A radial dynamic pressure gas bearing is formed by the inner periphery of the motor rotation body and the outer periphery of the support shaft. A thrust dynamic pressure gas bearing is formed by the protruded part of the motor rotation body and the recession of the support shaft. The thrust dynamic pressure gas bearing is provided below the top end of the radial dynamic pressure gas bearing. Clamping screw holes for holding a disk or a magnetic recording medium are formed in the top wall of the motor rotation body above the recession of the support shaft. Therefore, the diameter and length of the radial dynamic pressure gas bearing can be increased in the motor rotation body while the clamping screw holes for inserting screws to reliably hold a disk or a magnetic recording medium are formed in the top wall of the motor rotation body. Consequently, a dynamic pressure gas bearing motor that ensures sufficient bearing rigidity, reduced power consumption at low temperatures, and workability at high rotation speeds can be obtained.

Alternatively, the screw hole plate having clamping screw holes for holding a disk or a magnetic recording medium is attached to the top wall of the motor rotation body so that the clamping screw through-holes are formed in the screw hole plate. Thus, the top wall of the motor rotation body can have a reduced thickness. Consequently, the diameter and length of the radial dynamic pressure gas bearing can be maximized in the motor rotation body, which yields sufficient bearing rigidity. Furthermore, the screw holes are not formed directly in the motor rotation body constituting the dynamic pressure gas bearing. Therefore, the motor rotation body and screw hole plate can be cleaned separately in the cleaning step. This eliminates possible contamination of the bearing and surface of the motor rotation body with cutting oil and processing residue remaining in the clamping screw holes, improving the reliability and reducing substances that may cause malfunctions in the HDD device.

BEST MODE FOR CARRYING OUT THE INVENTION

Embodiments of the present invention are hereafter described with reference to the drawings.

(Embodiment 1)

A dynamic pressure gas bearing motor according to Embodiment 1 of the present invention is hereafter described with reference to FIGS. 1 to 6.

Figure 1:
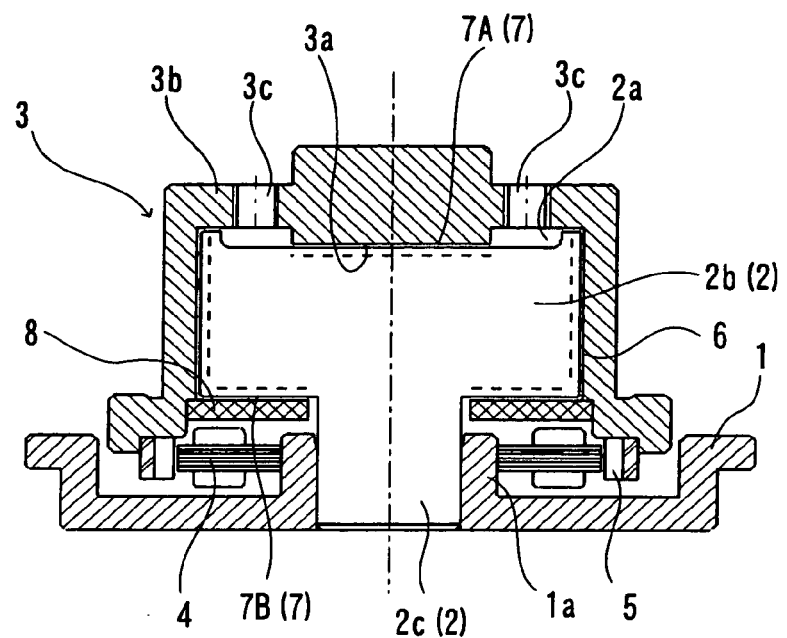
FIG. 1 is a front cross section of a dynamic pressure gas bearing motor according to Embodiment 1 of the present invention.

As shown in FIG. 1, the dynamic pressure gas bearing motor according to Embodiment 1 is different from the prior art dynamic pressure gas bearing motor in that a motor rotation body 3 is supported by a radial dynamic pressure gas bearing 6 formed by the inner periphery of the motor rotation body 3 and the outer periphery of the larger diameter part 2b of a support shaft 2 and also supported by a thrust dynamic pressure gas bearing 7A formed by the top surface of the recession 2a of the support shaft 2 and the bottom surface of the protruded part 3a of the motor rotation body 3 fitted in the recession 2a with clearance and the thrust dynamic pressure gas bearing 7A is provided below the top end of the radial dynamic pressure gas bearing 6.

Each part is described in detail hereafter.

As shown in FIG. 1, the support shaft 2 has a stepped cylindrical form with a larger diameter part 2b at the top and a smaller diameter part 2c at the bottom. The support shaft 1 is mounted upright on a mounting base 1 with its smaller diameter part 2c being pressed in or adhered to the supporting barrel 1 thereof. A closed-end cylindrical motor rotation body 3 (the top is closed with a covering and the bottom is open) is fitted on the larger diameter part 2b of the support shaft 2 to enclose it at the top and on the side with clearance. A rotor magnet 5 is provided on the inner periphery of a flange formed at the bottom of the motor rotation body 3. Provided at the outer periphery of the supporting barrel 1a of the mounting base 1, a set of stator coils 4 faces the rotor magnet 5. The rotor magnet 5 and stator coils 4 constitute a motor drive.

In this dynamic pressure gas bearing motor, the top surface of the larger diameter part 2b of the support shaft 2a has a downwardly recession and the motor rotation body has a protruded part that faces the recession 2a of the support shaft 2 and is fitted therein with clearance so that a radial dynamic pressure gas bearing 6 is formed by the inner periphery of the motor rotation body 3 and the inner periphery of the larger diameter part 2b of the support shaft and a thrust dynamic pressure gas bearing 7A is formed by the protruded part 3a of the motor rotation body 3 and the recession 2a of the support shaft 2. The thrust dynamic pressure gas bearing 7A is provided below the top end of the radial dynamic pressure gas bearing 6. Clamping screw holes 3c for holding a disk or a magnetic recording medium are formed in the top wall 3b of the motor rotation body 3 above the recession 2a of the support shaft 2.

In the dynamic pressure gas bearing motor shown in FIG. 1, the clamping screw holes 3c are through-holes formed in the top wall 3b of the motor rotation body 3 outside the protruded part 3a thereof and facing the recession 2a of the support shaft 2 from above.

The motor rotation body 3 is provided with a thrust collar 8 that flanks the larger diameter part 2b of the support shaft 2 from below with clearance so that a thrust dynamic pressure gas bearing 7B is also formed by the bottom surface of the larger diameter part 2b of the support shaft 2 and the top surface of the thrust collar 8. Therefore, the motor rotation body 3 is supported by the radial dynamic pressure gas bearing 6 formed by the inner periphery of the motor rotation body 3 and the outer periphery of the support shaft 2 and also supported by the thrust dynamic pressure gas bearing 7 (7A, 7B) formed by the recession 2a of the support shaft 2 and the protruded part 3a of the motor rotation body 3 and by the bottom surface of the larger diameter part 2b of the support shaft 2 and the top surface of the thrust collar 8.

Figure 3:
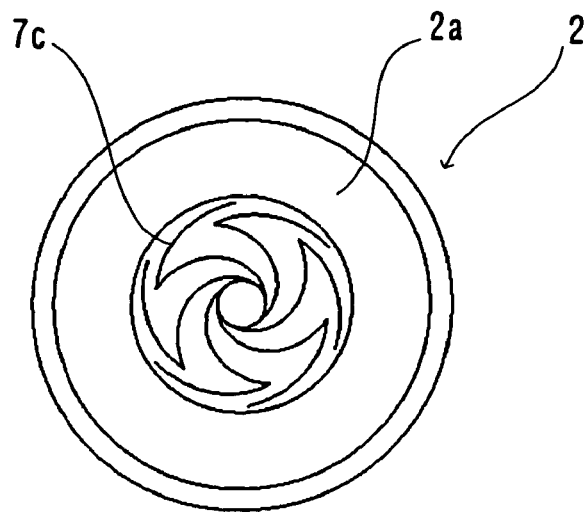
FIG. 3 is a plan view of the dynamic pressure gas bearing motor according to Embodiment 1 as shown in FIG. 1.
Figure 4:
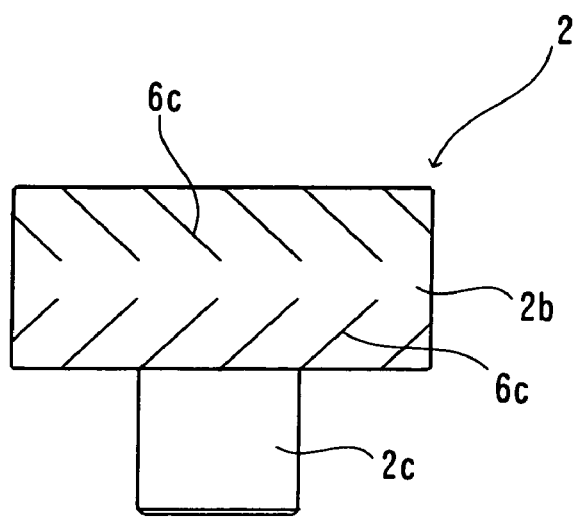
FIG. 4 is a front view of a support shaft of the same dynamic pressure gas bearing motor.
Figure 5:
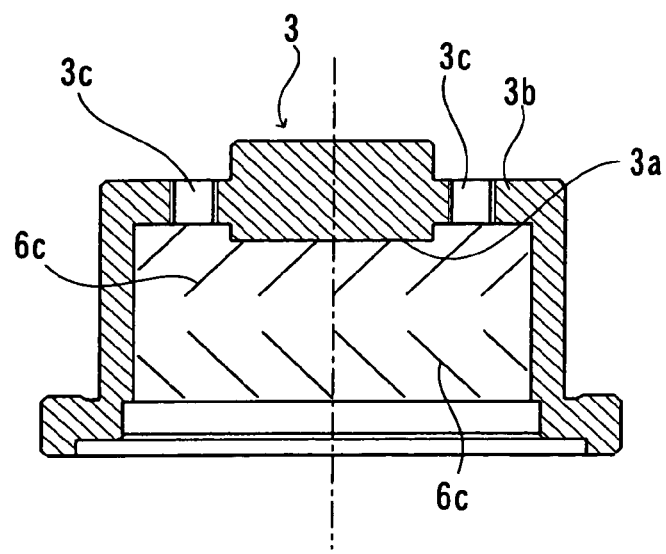
FIG. 5 is a front plan view of a motor rotation body of another embodiment of the same dynamic pressure gas bearing motor.
Figure 6:
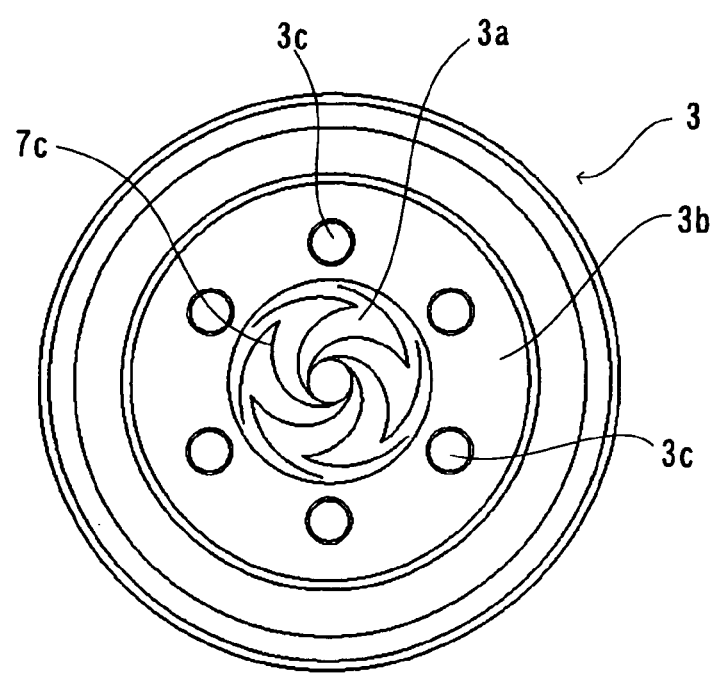
FIG. 6 is a bottom plan view of the motor rotation body of another embodiment of the same dynamic pressure gas bearing motor.

Dynamic pressure generating grooves 6c shown in FIGS. 4 and 5 are formed either on the inner periphery of the motor rotation body 3 or on the outer periphery of the support shaft 2 for the radial dynamic pressure gas bearing 6. Dynamic pressure generating grooves 7c shown in FIGS. 3 and 6 are formed either on the protruded part 3a of the motor rotation body 3 or on the recession 2a of the support shaft 2 as well as either on the bottom surface of the larger diameter part 2b of the support shaft 2 or on the top surface of the thrust collar 8 for the thrust dynamic pressure gas bearing 7 (7A, 7B).

Specifically, in the dynamic pressure gas bearing motor for an approximately 25 mm inner diameter standard disk of a 3.5 inch HDD device, the support shaft 2 for the radial dynamic pressure gas bearing 6 has a diameter of 17 to 23 mm, desirably approximately 21 mm, so that a large radial bearing rigidity can be obtained while ensuring the strength of the motor rotation body 3. The recession 2a of the support shaft 2 is 0.5 to 3 mm deep, desirable approximately 1 mm deep, below the top surface so that the protruded part 3a of the motor rotation body 3 and the recession 2a of the support shaft 2 can be formed with high precision. The effective thread length of the clamping screw holes 3c is 1 to 5 mm, desirably approximately 2 mm, so that a large radial bearing rigidity can be obtained while ensuring the strength of the motor rotation body 3. The pitch circle diameter of the clamping screw holes 3c is 12 to 20 mm, desirably approximately 18 mm, so that the thrust dynamic pressure gas bearing 7 can have a large area while ensuring the clamping force.

In the dynamic pressure gas bearing motor for an approximately 20 mm inner diameter standard disk of a 2.5 inch HDD device, the support shaft 2 for the radial dynamic pressure gas bearing 6 has a diameter of 14 to 18 mm, desirably approximately 17 mm, and the pitch circle diameter of the clamping screw holes 3c is 10 to 16 mm, desirably approximately 14 mm, so that the same excellent result can be obtained as the one for the 25 mm inner diameter disk.

FIG. 3 is a plane view of the support shaft 2.

FIG. 4 is a front view of the support shaft 2.

FIG. 5 is a front cross section of the motor rotation body.

FIG. 6 is a bottom plan view of the motor rotation body.

In these figures, the dynamic pressure generating grooves 6c and 7c are herringbone grooves. However, the shape of the dynamic pressure generating grooves 6c and 7c is not restricted to the herringbone type. Surface treatment, such as plating, DLC (diamond-like carbon), and plasma nitriding, can be applied to one or both surfaces of the radial dynamic pressure gas bearing 6 and thrust dynamic pressure gas bearing 7 for improved resistance to wear and reduced wear rates.

With the above construction, a rectified current is applied to the stator coils 4 to generate an electromagnetic force between the rotor magnet 5 and stator coils 4. This results in rotating the motor rotation body 3 and pressurizing the internal fluid or gas, for example the air, because of the dynamic pressure generating grooves 6c and 7c formed in the radial dynamic pressure gas bearing 6 and thrust dynamic pressure gas bearing 7. Thus, the motor rotation body 3 can rotate while the increased inner pressure serves to support the motor rotation body 3 in a highly precise manner making no contact with the support shaft 2.

As described above, the motor rotation body 3 is supported by the radial dynamic pressure gas bearing 6 formed by the inner periphery of the motor rotation body 3 and the outer periphery of the larger diameter part 2b of the support shaft 2 and also supported by the thrust dynamic pressure gas bearing 7A formed by the recession 2a of the support shaft 2 and the protruded part 3a of the motor rotation body 3, and the thrust dynamic pressure gas bearing 7A is provided below the top end of the radial dynamic pressure gas bearing 6. Therefore, regardless of the clamping screw holes 3c formed in the top wall 3b of the motor rotation body, the top wall 3b of the motor rotation body 3 can have a reduced thickness and the radial dynamic pressure gas bearing 6 can have an increased length so that a sufficient bearing rigidity can be produced to provide a dynamic pressure gas bearing motor with a high precision of rotation. Furthermore, the clamping screw holes 3c are formed in the top wall 3b of the motor rotation body 3 outside the protruded part 3a thereof; therefore, the thrust dynamic pressure gas bearing 7 can be formed by the protruded part 3a of the motor rotation body 3 and the recession 2a of the support shaft 2 without any inconveniences regardless of possible protrusions as a result of downward drilling or sealing of the clamping screw holes 3c.

Figure 2:
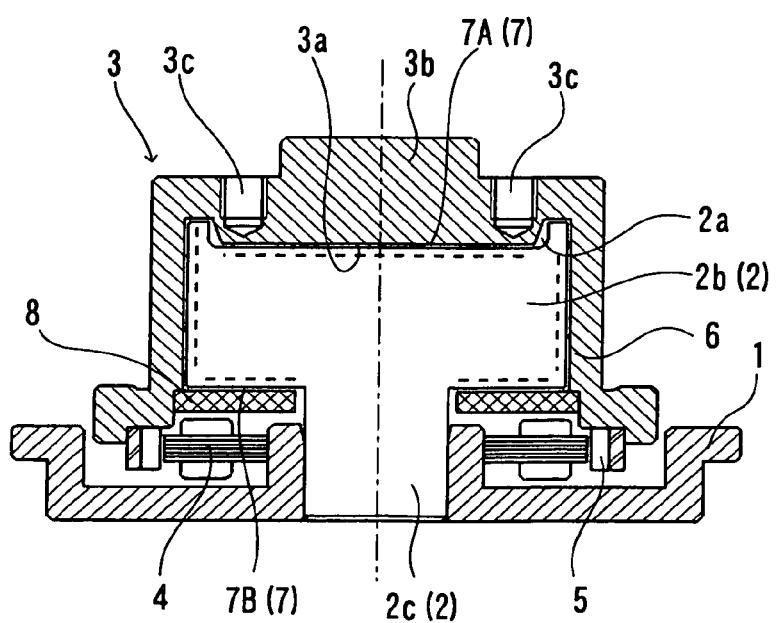
FIG. 2 is a front cross section of another dynamic pressure gas bearing motor according to Embodiment 1 of the present invention.

FIG. 2 is a front cross section of another dynamic pressure gas bearing motor according to this embodiment. In this dynamic pressure gas bearing motor, the clamping screw holes 3c are blind holes formed in the top wall of the motor rotation body 3 at the protruded part 3a, which do not reach the bottom surface of the protruded part 3a.

With this construction, the thrust dynamic pressure gas bearing 7A formed by the protruded part 3a of the motor rotation body 3 and the recession 2a of the support shaft 2 can have a larger area so that a dynamic pressure gas bearing motor that ensures a sufficient bearing rigidity regardless of the motor orientation, reduced power consumption at low temperatures, and a sufficient workability at high rotation speeds can be obtained.

Specifically, in the dynamic pressure gas bearing motor for an approximately 25 mm inner diameter standard disk of a 3.5 inch HDD device, the recession 2a of the support shaft 2 is 0.5 to 3 mm deep, desirable approximately 2 mm deep, below the top surface so that the protruded part 3a of the motor rotation body 3 and the recession 2a of the support shaft 2 can be formed with high precision. The effective thread length of the clamping screw holes 3c is 1 to 5 mm, desirably approximately 2 mm, so that an effective clamping force can be produced. The pitch circle diameter of the clamping screw holes 3c is 10 to 20 mm, desirably approximately 15 mm, so that the thrust dynamic pressure gas bearing 7 can have a large area while ensuring the clamping force.

In the dynamic pressure gas bearing motor for an approximately 20 mm inner diameter standard disk of a 2.5 inch HDD device, the pitch circle diameter of the clamping screw holes 3c is 10 to 16 mm, desirably approximately 12 mm, so that the same excellent result can be obtained as the one for the 25 mm inner diameter disk.

(Embodiment 2)

Figure 7:
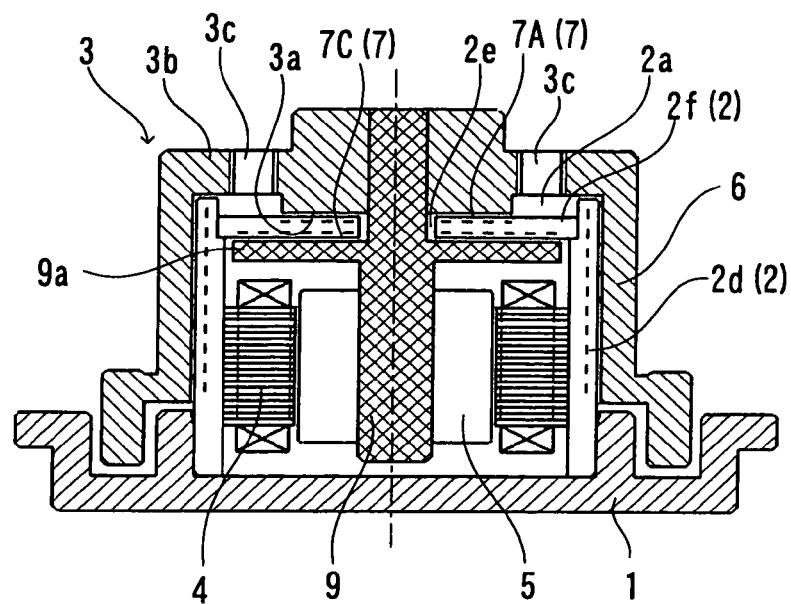
FIG. 7 is a front cross section of a dynamic pressure gas bearing motor according to Embodiment 2 of the present invention.
Figure 8:
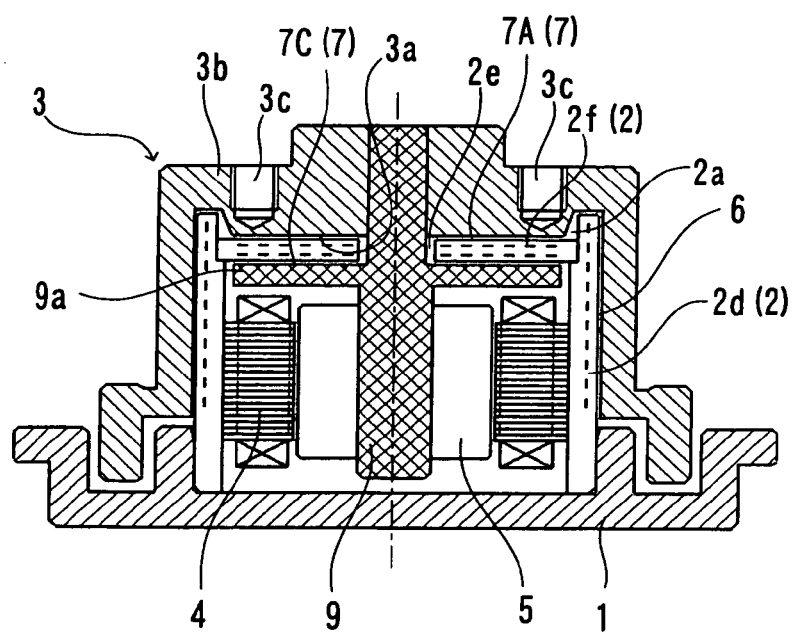
FIG. 8 is a front cross section of another dynamic pressure gas bearing motor according to Embodiment 2 of the present invention.

A dynamic pressure gas bearing motor according to Embodiment 2 of the present invention is described hereafter, with reference to FIGS. 7 and 8.

The dynamic pressure gas bearing motor according to Embodiment 2 uses a support shaft 2 consisting of a cylinder 2d mounted upright on a mounting base 1 and a thrust disk plate 2f having a center hole 2e and fixed to the inner periphery of the cylinder 2d at the top end thereof to form a recess. The top surface of the thrust plate 2f forms the recession 2a and the protruded part 3a of the motor rotation body 3 is fitted in the recession 2a with clearance. A column member 9 is provided coincidently with the rotation axis of the motor rotation body 3, passing through the center hole 2e of the thrust plate 2f and having a rotor magnet 5 at the outer periphery thereof. The column member 9 has a thrust collar or flange 9a above the rotor magnet 5a, which faces the bottom surface of the thrust plate 2f. In this way, a thrust dynamic pressure gas bearing 7C is formed by the bottom surface of the thrust plate 2f and the top surface of the thrust collar 9a. On the whole, the dynamic pressure gas bearing motor according to Embodiment 2 is different from the dynamic pressure gas bearing motor of Embodiment 1 in the points described above, otherwise having the same basic structure.

Specifically, as shown in FIG. 7, the support shaft 2 is mounted upright on a mounting base 1 with its cylinder 2d being pressed in or adhered thereto. The thrust plate 2f is fixed to the inner periphery of the cylinder 2d at the top end. A closed-end cylindrical (the top is closed with a covering and the bottom is open) motor rotation body 3 is fitted on the cylinder 2d and thrust plate 2f to enclose them at the top and on the side with clearance. The rotor magnet 5 is provided at the lower outer periphery of the column member 9 that coincides with the rotation axis of the motor rotation body 3. A set of stator coils 4 is provided in the cylinder 2d of the support shaft 2 to face the rotor magnet 5. The rotor magnet 5 and stator coils 4 constitute a motor drive.

The column member 9 has a thrust collar or flange 9 above the rotor magnet 5, which flanks the thrust plate 2f. The motor rotation body 3 is supported by a radial dynamic pressure gas bearing 6 formed by the inner periphery of the motor rotation body 3 and the outer periphery of the cylinder 2d of the support shaft 2 and also supported by a thrust dynamic pressure gas bearing 7 (7A, 7C) formed by the recession 2a, or the top surface of the thrust plate 2f, and the protruded part 3a of the motor rotation body 3 and by the bottom surface of the thrust plate 2f and the top surface of the thrust collar 9a. Here, dynamic pressure generating grooves are formed either on the inner periphery of the motor rotation body 3 or on the outer periphery of the cylinder 2d of the support shaft 2 for the radial dynamic pressure gas bearing 6. Dynamic pressure generating grooves are formed either on the recession 2d, or the top surface of the thrust plate 2f, or on the protruded part 3a of the motor rotation body 3 as well as either on the bottom surface of the thrust plate 2f or on the top surface of the thrust collar 9a for the thrust dynamic pressure gas bearing 7.

Also in the dynamic pressure gas bearing motor shown in FIG. 7, the thrust dynamic pressure gas bearing 7A is provided below the top end of the radial dynamic pressure gas bearing 6 and the clamping screw holes 3c for holding a disk or a magnetic recording medium are formed in the top wall 3b of the motor rotation body 3 above the recession 2a of the support shaft 2. The clamping screw holes 3c are through-holes formed in the top wall 3b of the motor rotation body 3 outside the protruded part 3b thereof and facing the recession 2a of the support shaft 2 from above.

With the above construction, a rectified current is applied to the stator coils 4 to generate an electromagnetic force between the rotor magnet 5 and stator coils 4. This results in rotating the motor rotation body 3 and pressurizing the internal fluid or gas, for example the air, because of the dynamic pressure generating grooves 6c and 7c formed in the radial dynamic pressure gas bearing 6 and thrust dynamic pressure gas bearing 7. Thus, the motor rotation body 3 rotates while the increased inner pressure serves to support the motor rotation body 3 in a highly precise manner making no contact with the support shaft 2.

Also with this construction, regardless of the clamping screw holes 3c formed in the top wall 3b of the motor rotation body 3, the top wall 3b of the motor rotation body 3 can have a reduced thickness and the radial dynamic pressure gas bearing 6 can have an increased length so that a sufficient bearing rigidity can be produced to provide a dynamic pressure gas bearing motor with a high precision of rotation. Furthermore, the clamping screw holes 3c are formed in the top wall 3b of the motor rotation body 3 outside the protruded part 3a thereof; therefore, the thrust dynamic pressure gas bearing 7 can be formed by the protruded part 3a of the motor rotation body 3 and the recession 2a of the support shaft 2 without any inconveniences regardless of possible protrusions as a result of downward drilling or sealing of the clamping screw holes 3c.

Furthermore, the motor drive consisting of the rotor magnet 5 and stator coils 4 is provided inside the support shaft 2 so that the radial dynamic pressure gas bearing 6 can have increased length. Consequently, a dynamic pressure gas bearing motor ensuring sufficient bearing rigidity and highly accurate rotations can be obtained.

As shown in FIG. 8, the clamping screw holes 3c can be blind holes formed in the top wall 3b of the motor rotation body 3 at the protruded part 3a, which do not reach the bottom surface of the protruded part 3a as is in the dynamic pressure gas bearing motor shown in FIG. 2. With this construction, the thrust dynamic pressure gas bearing 7A firmed by the protruded part 3a of the motor rotation body 3 and the recession 2a of the support shaft 2 can have a larger area so that a dynamic pressure gas bearing motor that ensures a sufficient bearing rigidity regardless of the motor orientation, reduced power consumption at low temperatures, and a sufficient workability at high rotation speeds can be obtained.

(Embodiment 3)

Figure 9:
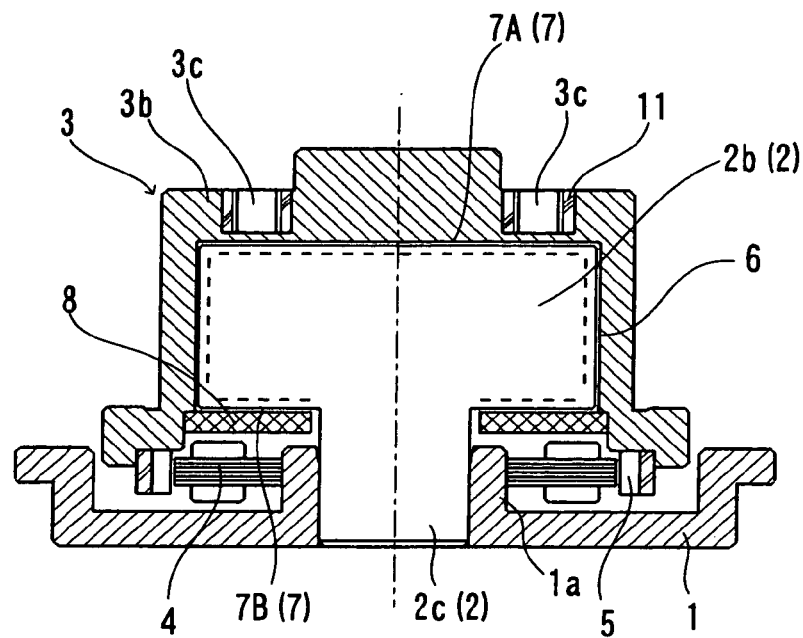
FIG. 9 is a front cross section of a dynamic pressure gas bearing motor according to Embodiment 3 of the present invention.
Figure 11:
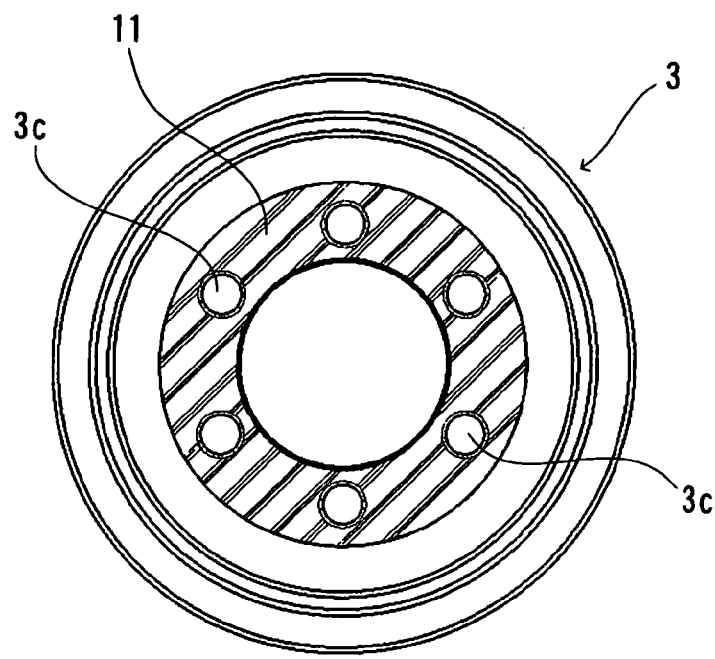
FIG. 11 is a plan view of a motor rotation body of the dynamic pressure gas bearing motors according to Embodiments 3 and 4 of the present invention.
Figure 12:
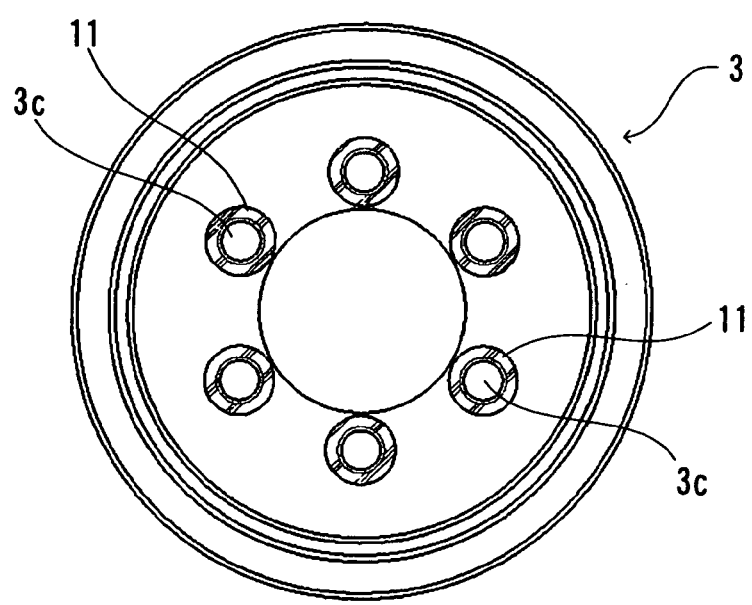
FIG. 12 is a plan view of another rotation body of the dynamic pressure gas bearing motors according to Embodiments 3 and 4 of the present invention.
Figure 13:
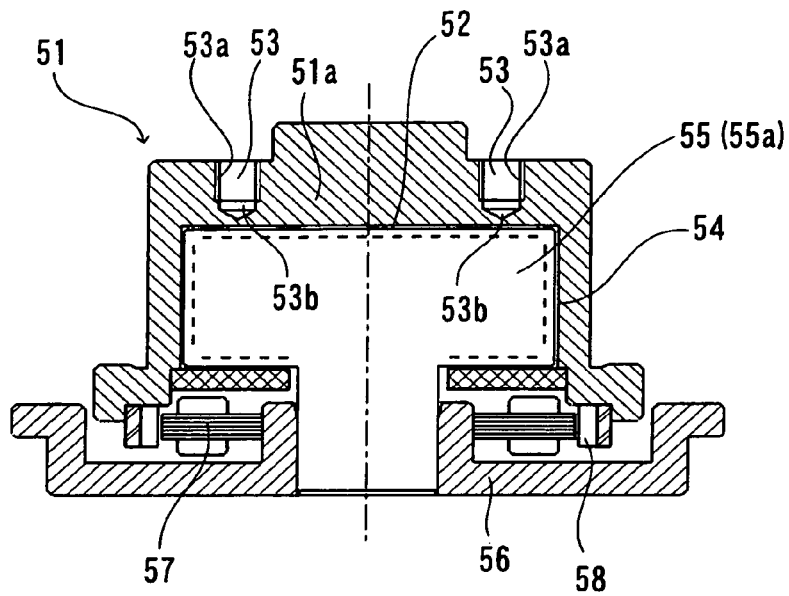
FIG. 13 is a front cross section of a prior art dynamic pressure gas bearing motor.
Figure 14:
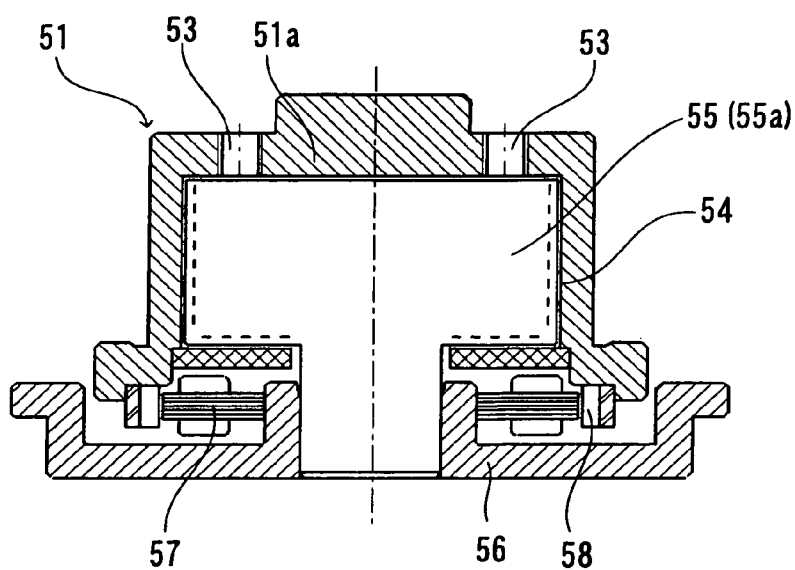
FIG. 14 is a front cross section of another prior art dynamic pressure gas bearing motor.

A dynamic pressure gas bearing motor according to Embodiment 3 of the present invention is described hereafter, with reference to FIGS. 9, 11, and 12.

The dynamic pressure gas bearing motor according to Embodiment 3 is different from the prior art dynamic pressure gas bearing motors discussed above in that a screw hole plate 11 having clamping screw holes 3c for holding a disk or a magnetic recoding medium is attached to the top wall 3b of the motor rotation body 3 as shown in FIG. 9.

Specifically, as shown in FIG. 9, the support shaft 2 has a stepped cylinder form with a larger diameter part 2b at the top and a smaller diameter part 2c. The support shaft 2 is mounted upright on a mounting base 1 with its smaller diameter part 2c being pressed therein or adhered thereto. A closed-end cylindrical (the top is closed with a covering and the bottom is open) motor rotation body 3 is fitted on the larger diameter part 2b of the support shaft 2 to enclose the outer periphery thereof at the top and on the side with clearance. A thrust dynamic pressure gas bearing 7A is formed by the top surface of the larger diameter part 2b of the support shaft 2 and the bottom surface of the motor rotation body 3 that faces the top surface of the larger diameter part 2b (that is the bottom surface of the top wall 3b of the motor rotation body 3). A rotor magnet 5 is provided at the inner periphery of the flange provided at the bottom of the motor rotation body 3. A set of stator coils 4 is provided on the outer periphery of the supporting barrel 1a of the mounting base 1 to face the rotor magnet 5. The rotor magnet 5 and stator coils 4A constitutes a motor drive.

The screw hole plate 11 having clamping screw holes 3c for holding a disk or a magnetic recoding medium is attached to the top wall 3b of the motor rotation body 3. This screw hole plate 11 has a thickness of 1 to 5 mm, desirable approximately 2 mm. The screw hole plate 1 has for example a ring shape having multiple clamping screw through-holes 3c formed at specified intervals as shown in FIG. 11.

The motor rotation body 3 has a thrust collar 8 that flanks the larger diameter part 2b of the support shaft 2 from below with clearance so that a thrust dynamic pressure gas bearing 7B is also formed by the bottom surface of the larger diameter part 2b of the support shaft 2 and the top surface of the thrust collar 8. Therefore, the motor rotation body 3 is supported by the radial dynamic pressure gas bearing 6 formed by the inner periphery of the motor rotation body 3 and the outer periphery of the support shaft 2 and also supported by the thrust dynamic pressure gas bearing 7 (7A, 7B) formed by the top surface of the larger diameter part 2b of the support shaft 2 and the bottom surface of the top wall 3b of the motor rotation body 3 and by the bottom surface of the larger diameter part 2b of the support shaft 2 and the top surface of the thrust collar 8. Here, dynamic pressure generating grooves are formed either on the inner periphery of the motor rotation body 3 or on the outer periphery of the support shaft 2 for the radial dynamic pressure gas bearing 6. Dynamic pressure generating grooves are formed either on the top surface of the larger diameter part 2b of the support shaft 2 or on the bottom surface of the top wall 3b of the motor rotation body 3 as well as either on the bottom surface of the larger diameter part 2b of the support shaft 2 or on the top surface of the thrust collar 8 for the thrust dynamic pressure gas bearing 7 (7A, 7B)

With the above construction, a rectified current is applied to the stator coils 4 to generate an electromagnetic force between the rotor magnet 5 and stator coils 4. This results in rotating the motor rotation body 3 and pressurizing the internal fluid or gas, for example the air, because of the dynamic pressure generating grooves 6c and 7c formed in the radial dynamic pressure gas bearing 6 and thrust dynamic pressure gas bearing 7. Thus, the motor rotation body 3 rotates while the increased inner pressure serves to support the motor rotation body 3 in a highly precise manner making no contact with the support shaft 2.

Furthermore, with the above construction, the clamping screw holes 3c are through-holes formed in the screw hole plate 11, not directly in the top wall 3b of the motor rotation body 3. This can eliminates potential incomplete prepared screw holes, namely, round holes with no threads in the screw processing and allows the motor rotation body 3 to have a thinner top wall 3b even for a standard length screw. As a result, the diameter and length of the radial dynamic pressure gas bearing 6 can be maximized in the motor rotation body 3 so that a sufficient bearing rigidity can be obtained. Because the motor rotation body 3 constituting a dynamic pressure gas bearing has no holes formed, the motor rotation body 3 and screw hole plate 11 can be cleaned separately at the cleaning step. This can prevent possible contamination of the bearing part and surface of the motor rotation body 3 with cutting oil and processing residue in the clamping screw holes 3c, improving the reliability and reducing the substances that likely causes malfunctions in the HDD device. The screw hole plate 11 having the clamping screw holes 3c is not exposed from the top wall 3b of the motor rotation body 3. Therefore, the thrust dynamic pressure gas bearing 7A is appropriately constituted by the top surface of the larger diameter part 2b of the support shaft 2 and the bottom surface of the top wall 3b of the motor rotation body 3 after the screw hole plate 11 is attached to the top wall 3b of the motor rotation body 3 even if the screw hole plate 11 has any protrusions as a result of downward drilling at the positions of the clamping screw holes 3c.

The screw hole plate 11 has a ring shape with multiple clamping screw through-holes 3c formed at specified intervals. Therefore, the screw hole plate 11 can be precisely positioned to attach it to the motor rotation body 3 and the clamping screw holes 3 themselves can be precisely positioned.

Alternatively, as shown in FIG. 12, the screw hole plate 11 may have a single clamping screw through-hole 3c and multiple screw hole plates 11 can be attached to the top wall 3b of the motor rotation body 3 at specified intervals.

With this construction, the screw hole plate 11 can be standardized and attached to the top wall 3b of the motor rotation body 3 for clamps with different mounting pitch diameters. This will save cost.

(Embodiment 4)

Figure 10:
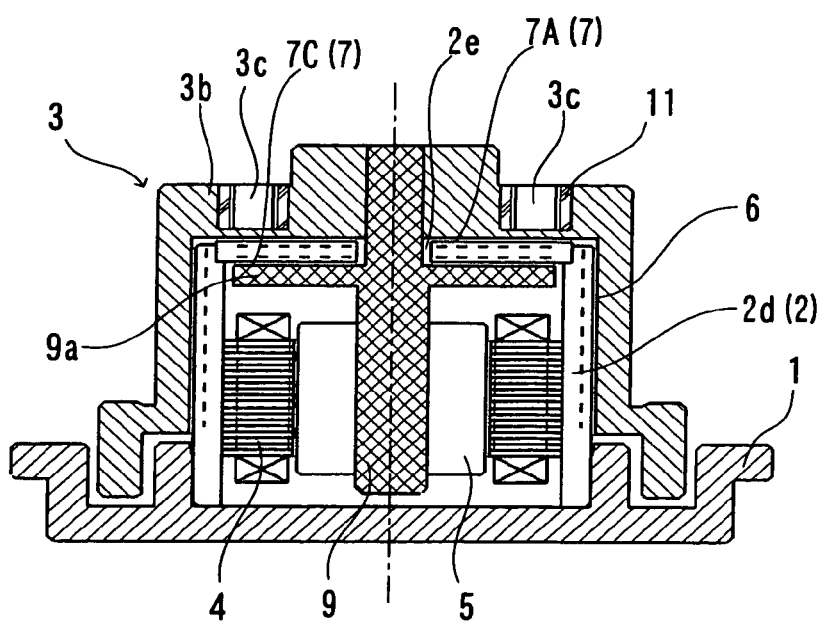
FIG. 10 is a front cross section of a dynamic pressure gas bearing motor according to Embodiment 4 of the present invention.

A dynamic pressure gas bearing motor according to Embodiment 4 of the present invention is hereafter described with reference to FIG. 10.

The dynamic pressure gas bearing motor according to Embodiment 4 uses a support shaft 2 consisting of a cylinder 2d mounted upright on a mounting base 1 and a thrust disk plate 2f having a center hole 2e and fixed to the inner periphery of the cylinder 2d at the top end. The bottom surface of the top wall 3b of the motor rotation body 3 faces the top surface of the thrust plate 2f with clearance. A column member 9 is provided coincidently with the rotation axis of the motor rotation body 3, passing through the center hole 2e of the thrust plate 2f and having a rotor magnet 5 at the outer periphery. The column member 9 has a thrust collar or flange 9a above the rotor magnet 5, which faces the bottom surface of the thrust plate 2f. In this way, a thrust dynamic pressure gas bearing 7C is formed by the bottom surface of the thrust plate 2f and the top surface of the thrust collar 9a. On the whole, the dynamic pressure gas bearing motor according to this embodiment is different from the dynamic pressure gas bearing motor of Embodiment 3 in those aspects described above, otherwise having the same basic structure.

Specifically, as shown in FIG. 7, the support shaft 2 is mounted upright on a mounting base 1 with its cylinder 2d being pressed therein or adhered thereto. The thrust plate 2f is fixed to the inner periphery of the cylinder 2d at the top end. A closed-end cylindrical (the top is closed with a covering and the bottom is open) motor rotation body 3 is fitted on the cylinder 2d and thrust plate 2f to enclose them at the top and on the side with clearance. The rotor magnet 5 is provided at the lower outer periphery of the column member 9 that coincides with the rotation axis of the motor rotation body 3. A set of stator coils 4 is provided in the cylinder 2d of the support shaft 2 to face the rotor magnet 5. The rotor magnet 5 and stator coils 4 constitute a motor drive.

The column member 9 has the thrust collar or flange 9a above the rotor magnet 5, which flanks the thrust plate 2f. The motor rotation body 3 is supported by a radial dynamic pressure gas bearing 6 formed by the inner periphery of the motor rotation body 3 and the outer periphery of the cylinder 2d of the support shaft 2 and is also supported by a thrust dynamic pressure gas bearing 7 (7A, 7C) formed by the top surface of the thrust plate 2f and the bottom (lower) surface of the top wall 3b of the motor rotation body 3 and by the bottom surface of the thrust plate 2f and the top surface of the thrust collar 9a. Here, dynamic pressure generating grooves are formed either on the inner periphery of the motor rotation body 3 or on the outer periphery of the cylinder 2d of the support shaft 2 for the radial dynamic pressure gas bearing 6. Dynamic pressure generating grooves are formed either on the top surface of the thrust plate 2f or on the bottom surface of the top wall 3b of the motor rotation body 3 as well as either on the bottom surface of the thrust plate 2f or on the top surface of the thrust collar 9a for the thrust dynamic pressure gas bearing 7.

Also in this dynamic pressure gas bearing motor, a screw hole plate 11 with clamping screw holes 3c for holding a disk or a magnetic recording medium is attached to the top wall 3b of the motor rotation body 3. The screw hole plate 11 has a ring shape with multiple clamping screw through-holes 3c formed at specified intervals as shown in FIG. 11.

With the above construction, a rectified current is applied to the stator coils 4 to generate an electromagnetic force between the rotor magnet 5 and stator coils 4. This results in rotating the motor rotation body 3 and pressurizing the internal fluid or gas, for example the air, because of the dynamic pressure generating grooves 6c and 7c formed in the radial dynamic pressure gas bearing 6 and thrust dynamic pressure gas bearing 7. Thus, the motor rotation body 3 rotates while the increased inner pressure serves to support the motor rotation body 3 in a highly precise manner making no contact with the support shaft 2.

Furthermore, with the above construction, the clamping screw through-holes 3c are formed in the screw hole plate 11, not directly in the top wall 3b of the motor rotation body 3. This can eliminates potential incomplete prepared screw holes, namely, round holes with no threads in the screw processing and allows the motor rotation body 3 to have a thinner top wall 3b even for a standard length screw. As a result, the diameter and length of the radial dynamic pressure gas bearing 6 can be maximized in the motor rotation body 3 so that a sufficient bearing rigidity can be obtained.

Because the motor rotation body 3 constituting a dynamic pressure gas bearing has no holes formed, the motor rotation body 3 and screw hole plate 11 can be cleaned separately at the cleaning step. This can prevent possible contamination of the bearing part and surface of the motor rotation body 3 with cutting oil and processing residue remaining in the clamping screw holes 3c, improving the reliability and reducing the substances that likely causes malfunctions in the HDD device.

The screw hole plate 11 has a ring shape with multiple clamping screw through-holes 3c formed at specified intervals. Therefore, the screw hole plate 11 can be precisely positioned to attach it to the motor rotation body 3 and the clamping screw holes 3 themselves can be precisely positioned.

Alternatively, as shown in FIG. 12, the screw hole plate 11 may have a single clamping screw through-hole 3c and multiple screw hole plates 11 can be attached to the top wall 3b of the motor rotation body 3 at specified intervals. With this construction, in addition to the precise positioning of the screw hole plate 11 to attach it to the motor rotation body 3, the screw hole plate 11 can be standardized and attached to the top wall 3b of the motor rotation body 3 for clamps with different mounting pitch diameters. This will save cost.

Furthermore, with the above construction, the motor drive consisting of the rotor magnet 5 and stator coils 4 is provided inside the support shaft so that the radial dynamic pressure gas bearing 6 can have an increased length, which yields a sufficient bearing rigidity. Thus, a dynamic pressure gas bearing motor with high precision of rotation can be obtained.

In the embodiments 1 to 4, the support shaft is mounted upright on the mounting base. However, the support shaft 2 and motor rotation body 3 are described in their relative positions to the mounting base 1. The directions described above are not restricted to the vertical direction according to the gravity.

The invention claimed is:

1. A dynamic pressure gas bearing motor, in which a cylindrical support shaft (2) is mounted upright on a mounting base (1), a closed-end cylindrical motor rotation body (3) is fitted on the support shaft (2) to enclose the outer periphery thereof at the top and on the side with clearance, a rotor magnet (5) is provided to the motor rotation body (3) or a member attached to the motor rotation body (3), a set of stator coils (4) is provided concentrically with the support shaft (2) and facing the rotor magnet (5), the motor rotation body (3) is supported by a radial dynamic pressure gas bearing (6) and a thrust dynamic pressure gas bearing (7) formed by the clearance, wherein the top surface of the support shaft (2) has a downward recession, the motor rotation body (3) has a protruded part (3a) facing the recession (2a) of the support shaft (2) and fitted therein with clearance, the radial dynamic pressure gas bearing (6) is formed by the inner periphery of the motor rotation body (3) and the outer periphery of the support shaft (2), the thrust dynamic pressure gas bearing (7A) is formed by the protruded part (3a) of the motor rotation body (3) and the recession (2a) of the support shaft (2), the thrust dynamic pressure gas bearing (7A) is provided below the top end of the radial dynamic pressure gas bearing (6), and clamping screw holes (3c) for holding a disk or a magnetic recording medium are formed in the top wall (3b) of the motor rotation body (3) above the recession (2a) of the support shaft (2).

2. The dynamic pressure gas bearing motor according to claim 1, wherein the clamping screw holes (3c) are through-holes formed in the top wall (3b) of the motor rotation body (3) outside the protruded part (3a) and facing the recession (2a) of the support shaft (2) from above.

3. The dynamic pressure gas bearing motor according to claim 1, wherein the clamping screw holes (3c) are blind holes formed in the top wall (3b) of the motor rotation body (3) within the protruded part (3a), the blind holes not reaching the bottom surface of the protruded part (3a).

4. The dynamic pressure gas bearing motor according to claim 1, wherein the support shaft (2) has a stepped cylindrical form provided with a larger diameter part (2b) having a larger diameter than the joint part to the mounting base (1), the motor rotation part (3) is provided with a thrust collar (8) that flanks the larger diameter part (2b) of the support shaft (2) from below with clearance, and a thrust dynamic pressure gas bearing (7B) is formed by the bottom surface of the larger diameter part (2b) of the support shaft (2) and the top surface of the thrust collar (8).

5. The dynamic pressure gas bearing motor according to claim 1, wherein the support shaft (2) comprises a cylinder (2d) mounted upright on the mounting base (1) and a thrust disk plate (2f) having a center hole (2e) and fixed to the inner periphery of the cylinder (2d) at the top end to serve as a recession, the motor rotation body (3) includes at a position of a rotation axis thereof a column member (9) passing through the center hole (2e) of the thrust plate (2f) of the support shaft (2) and having a rotor magnet (5) at the outer periphery thereof, the support shaft (2) includes inside the cylinder (2d) thereof a set of stator coils (4) to face the rotor magnet (5), the radial dynamic pressure gas bearing (6) is formed by the inner periphery of the motor rotation body (3) and the outer periphery of the cylinder (2d) of the support shaft (2), and the thrust dynamic pressure gas bearing (7A) is formed by the protruded part (3a) of the motor rotation body (3) and the top surface of the thrust plate (2f) of the support shaft (2) serving as the recession (2a).

6. The dynamic pressure gas bearing motor according to claim 5, wherein a thrust collar or flange (9a) is provided to the column member (9) above the rotor magnet (5) to face the bottom surface of the thrust plate (2f), and a thrust dynamic pressure gas bearing (7C) is formed by the bottom surface of the thrust plate (2f) and the top surface of the thrust collar (9a).

* * * * *